Dec. 15, 1942. C. M. McAFEE 2,305,435
VEGETABLE DISPLAY STAND
Filed April 21, 1941
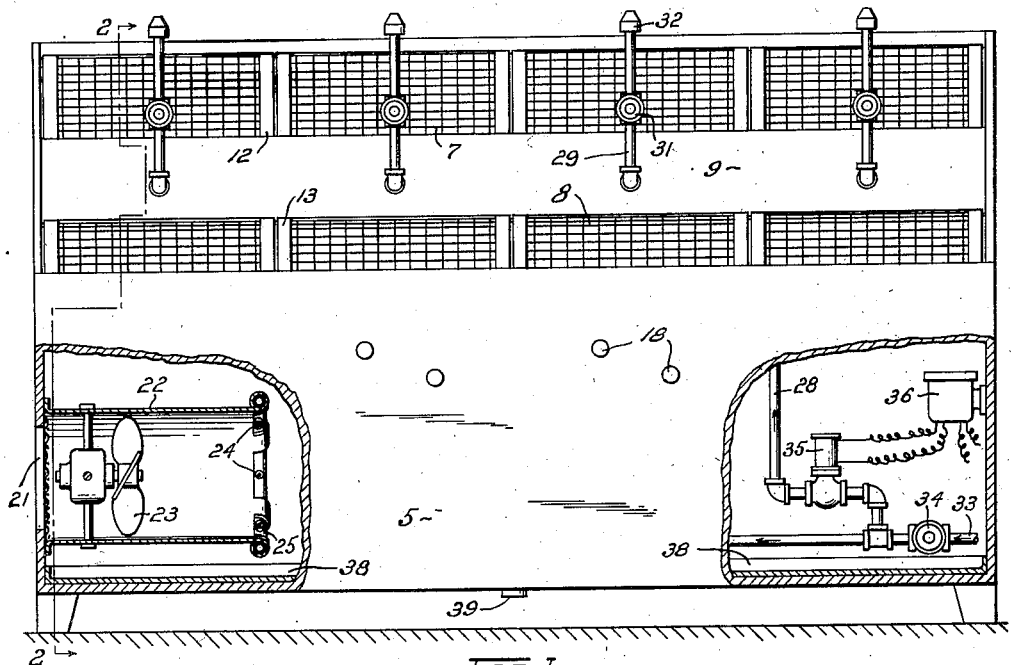
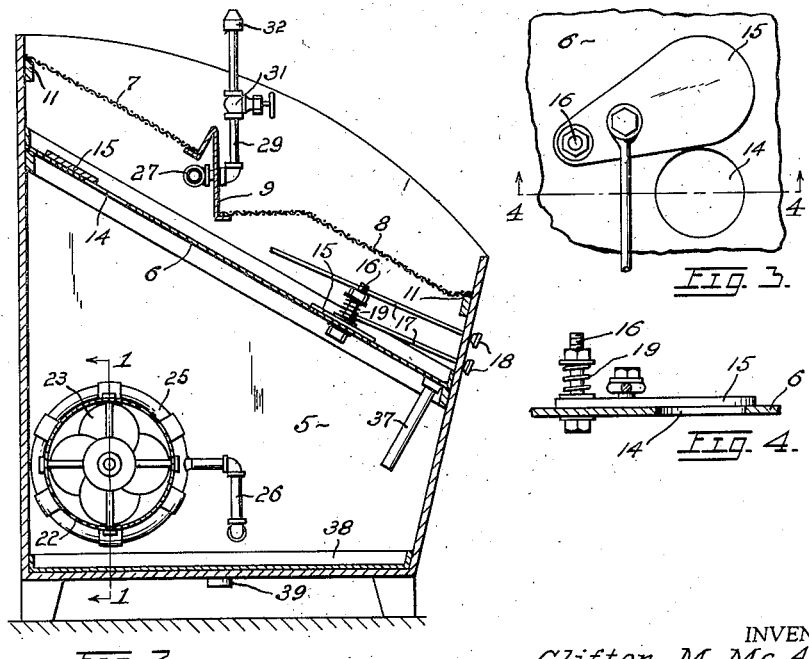
INVENTOR;
Clifton M. McAfee,
BY Arthur J. Farnsworth.
Attorney.

Patented Dec. 15, 1942

2,305,435

UNITED STATES PATENT OFFICE 2,305,435

VEGETABLE DISPLAY STAND

Clifton M. McAfee, Beverly Hills, Calif.

Application April 21, 1941, Serial No. 389,514

5 Claims. (Cl. 211—127)

My invention relates to vegetable display stands for public markets. Among its principal objects are; first, to promote hygienic marketing of vegetables and like wares, by providing means for maintaining them in upwardly flowing currents of suitably conditioned air; second, to supply independent means for sectionally adjusting said air currents, to fit conditions at different parts of the stand; third, to furnish independently proportionable means for automatically watering the vegetables locally; Fourth, to accomplish such adjusted watering periodically, for pre-determined periods according to requirements; and fifth, to secure said advantages by means of a simple, dependable, and relatively inexpensive construction. Other objects and advantages of my invention will appear in the following description thereof.

My objects are attained in the manner illustrated in the accompanying drawing, in which—

Figure 1 is a front elevation of an approved embodiment of my invention; certain parts thereof being shown as broken, and other parts being shown in vertical central section, for conveniently making this disclosure;

Figure 2 is vertical sectional view of said construction, taken on the planes indicated by broken line 2—2 of Fig. 1;

Figure 3 is a face view of one of the air current controlling valves used in my device, on an enlarged scale, together with its co-operating elements; and Figure 4 is a sectional view of said valve and elements, taken on the plane indicated by broken line 4—4 of Fig. 3.

The figures of the drawing are somewhat diagrammatic, and are not to scale. Similar numerals refer to similar things throughout the several views.

In the form selected for the purposes of this disclosure, my invention comprises an open-top box, indicated at 5. This has a fixed forwardly sloping partition 6, extending horizontally from end to end of the box between its top and bottom. There are two series of removable screens 7 and 8 above, substantially parallel to, and co-extensive with, partition 6. A horizontal member 9 is provided, for supporting the inner edges of all the screens; and ledges 11 are used for supporting the outer screen edges.

The screens preferably are of relatively coarse mesh, and are kept in desired form by means of frames 12 and 13 respectively. They constitute sloping shelves, for holding and displaying vegetables and like merchandise; and they permit air currents to pass upwardly therethrough, and through the spaces between the things stacked upon them.

Partition 6 has a plurality of spaced apertures 14 through it. Preferably there is one such aperture beneath the central portion of each screen of the series 7 and 8. Each aperture is provided with a slidable cover 15, by means of which it may be variably closed for adjusting an upward flow of air through it and the screen above it. These covers are swingable about pivots 16, may be moved by means of rods 17 and knobs 18, and are frictionally held in desired positions by compression springs 19.

The space below partition 6 is wholly enclosed, and is substantially air tight; except for a screened air intake 21 at one end, and such air delivery openings as may be afforded by unclosed apertures 14. Surrounding the air intake, is a cylindrical housing 22. In that, a motor-driven fan 23 is installed at the intake end, and a circularly disposed series of fog nozzles 24 are directly radially inwardly at the discharge end. The nozzles are connected to a water supply, by means of a pipe ring 25 upon which they are mounted, and by delivery pipe 26. When the device is in operation, air from the fan is compelled to flow through a fog curtain at the discharge end of housing 22. It will thus be washed, become humidified, and be cooled by evaporation of the small water droplets constituting the fog curtain. Thus conditioned, the air will pass upwardly; through the openings afforded by apertures 14, the screens above them, and the interstices of the merchandise stacked upon the screens.

In addition to treating displayed vegetables in the manner described, it usually is desirable to spray them intermittently from above. Accordingly, I mount a water header pipe 27 at the rear of member 9, and connect it to a delivery pipe 28 and the desired plurality of spray pipes 29. Valves 31 regulates flows through the individual spray pipes, and through spray nozzles 32 at the upper ends of these pipes, the nozzles being adapted to discharge a fine spray or mist into the air, to water the vegetables stacked on the screens below them.

Delivery pipes 26 and 28 branch from a common water supply pipe 33; and a valve 34 is provided to shut off, or regulate, the water coming to the device.

It has been found to be inadvisable in most cases, to water displayed vegetables from above continuously. Intermittent watering is preferable, and intermittent watering in regularly recurring cycles, for prescribed short periods at the proper rate, is even better. Therefore, to accomplish such watering, in addition to the facilities described, I provide; a solenoid valve 35 in delivery pipe 28, and a time switch 36 for controlling the operation of the solenoid valve. Both such devices are well known and available, and they need not be described in detail here. It is sufficient to say; that the solenoid valve always should be either completely closed or fully open; and that the time switch should be driven by a synchronous motor, and be readily adjustable as to its periods of closing and opening the circuit of the solenoid valve.

Sloping partition 6 preferably is made of impervious material; and should have a water-tight joint therearound, especially at its lower edge. A drain pipe 37 can then be used for carrying off excess water from spray nozzles 32. In the construction illustrated, this drain pipe discharges into a drip pan 38 below it. Excess water from fog nozzles 24 also falls into the drip pan. A sump connection 39 is provided for discharging the drip pan, in some convenient manner.

It should be noted that the use of pre-conditioned air in the manner described, secures a number of most desirable results. Blowing the air upwardly, through the interstices in the vegetable stacks, and away from them into the surrounding atmosphere, effectively prevents settlement of dust and disease germs upon the vegetables. It also strongly tends to drive away flies, and other insect pests. The pre-cooled air, furthermore, encounters the bottoms of the stacks first, and the centers next, and greatly reduces spoilage which originates at those places in that order. The chief deterioration areas thus are maintained at the coldest temperature practicable in display devices of the class here described.

It will be seen also, that excessive watersoaking of displayed vegetables may be obviated in the use of my device; by proper adjustment of valves 31, and the contact periods of time-switch 36.

Finally it will be appreciated that the provision of the many spaced and independently adjustable apertures 14, affords a very satisfactory means for apportioning and distributing the flow of conditioned air throughout the entire stack of vegetables. Slight adjustments of knobs 18, from time to time, allow of meeting changed conditions, and variations in the merchandise loadings.

Hence one section of the vegetable stack need not be permitted to monopolize the conditioned air supply, and all sections may receive an adequate air flow apportioned to their needs.

Obviously my invention may be utilized in many forms which differ from those herein shown and described.

I claim:

1. A display stand comprising; a box-like structure having an open top; a screened area which is adapted for displaying perishable merchandise thereon, at said top; means within the structure for sequentially drawing air inwardly, conditioning it, and forcing it outwardly through said area and the interstices of said merchandise; and means whereby the flow of air may be apportioned selectively with respect to different portions of said area.

2. A display stand comprising; a box-like structure having an open top; screens which are adapted for sectionalizing and displaying perishable merchandise thereon, covering said top; a partition below the screens, spaced therefrom substantially parallel thereto, co-extensive with the inner horizontal dimensions of the structure, and having spaced apertures therethrough; means within the structure, below said partition, for sequentially drawing air inwardly, conditioning it, and forcing it outwardly through said apertures, screens, and the interstices of said merchandise; and independently adjustable means for varying the effective area of said apertures to apportion the flow of air with respect to said screens.

3. Construction as set forth in claim 1, wherein the air conditioning means include apparatus for producing a fog curtain through which the air to be conditioned is constrained to pass; and which is adapted to wash, humidify, and cool the air before it is forced outwardly through said screened area.

4. Construction as set forth in claim 1, in combination with means for exteriorly spraying said merchandise to make up deficiencies in the conditioned air treatment of the merchandise with respect to moisture.

5. Construction as set forth in claim 1 in combination with means for automatic exterior spraying of said merchandise periodically, for pre-determined spaced periods, to make up deficiencies in the conditioned air treatment of the merchandise with respect to moisture requirements.

CLIFTON M. McAFEE.